US007643038B2

(12) United States Patent
King

(10) Patent No.: US 7,643,038 B2
(45) Date of Patent: Jan. 5, 2010

(54) VIRTUAL DEVICE BUFFER FOR EMBEDDED DEVICE

(75) Inventor: Scott Howard King, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 398 days.

(21) Appl. No.: 11/266,082

(22) Filed: Nov. 2, 2005

(65) Prior Publication Data

US 2007/0002060 A1 Jan. 4, 2007

Related U.S. Application Data

(60) Provisional application No. 60/696,187, filed on Jun. 29, 2005.

(51) Int. Cl.
*G09G 5/00* (2006.01)
*G06F 15/16* (2006.01)

(52) U.S. Cl. ....................... 345/649; 345/502; 345/543; 345/544; 345/545; 345/658; 345/602; 382/293; 382/296

(58) Field of Classification Search ................. 345/649, 345/543–545, 655–658, 502, 539, 555, 602; 382/293–296
See application file for complete search history.

(56) References Cited

U.S. PATENT DOCUMENTS 5,111,192 A * 5/1992 Kadakia ..................... 345/658
5,412,766 A * 5/1995 Pietras et al. ............... 345/602
5,598,181 A * 1/1997 Kermisch ................... 345/658
5,801,717 A * 9/1998 Engstrom et al. ........... 345/539
5,844,560 A * 12/1998 Crutcher et al. ............. 715/840
5,936,616 A * 8/1999 Torborg et al. .............. 345/555
5,966,116 A * 10/1999 Wakeland ................... 345/658
5,986,672 A * 11/1999 Groezinger et al. ......... 345/649
6,366,289 B1 * 4/2002 Johns ......................... 345/543
6,757,447 B2 * 6/2004 Yamaguchi et al. ......... 382/293

(Continued)

*Primary Examiner*—Jin-Cheng Wang
(74) *Attorney, Agent, or Firm*—Timothy F. Loomis; Michael J. Dehaemer, Jr.

(57) ABSTRACT

Apparatus are provided, including an embedded display processor on a given chip. The apparatus may be an embedded device, for example, a mobile wireless communications device. More specifically, the apparatus may be a mobile phone, a portable gaming device, a video streaming device, or a GPS map drawing device. The display processor includes, on the same given chip, a rendering memory, from which pixels are rendered to a display device. The display processor further includes an image manipulation mechanism to manipulate pixels of a given image frame from source positions in a pre-manipulation buffer, to target positions in the rendering memory, the target positions corresponding to rendered positions in the given image frame. The display processor further includes a fetch mechanism to fetch, from the pre-manipulation buffer, a predetermined number of neighboring pixels including adjacent cross-row pixels traversing a plurality of rows while in their source positions, the adjacent cross-row pixels being intended for target positions in a common row in accordance with the manipulation to be performed by the manipulation mechanism. The display processor further includes a send mechanism to send, from the rendering memory, a set of the neighboring pixels, including adjacent common row pixels on a common row after having been manipulated, to the display device in accordance with a given dynamic refresh rate and scheme. The display processor further includes a reconfigure mechanism to periodically reconfigure a manner of assignment of addresses and physical locations for data stored in the rendering memory.

44 Claims, 10 Drawing Sheets

U.S. PATENT DOCUMENTS 6,825,845 B2 * 11/2004 Nally ......................... 345/545
7,050,071 B2 * 5/2006 Wyatt et al. ................. 345/649
7,376,286 B2 * 5/2008 Locker et al. ............... 382/296
2004/0052431 A1 * 3/2004 Locker et al. ............... 382/296
2004/0239690 A1 * 12/2004 Wyatt et al. ................. 345/649
2005/0184993 A1 * 8/2005 Ludwin et al. .............. 345/502
2005/0275665 A1 * 12/2005 Kejser ........................ 345/649

* cited by examiner

| | | | | |
|---|---|---|---|---|
| 0 | 4 | 8 | 12 | 16 |
| 1 | 5 | 9 | 13 | 17 |
| 2 | 6 | 10 | 14 | 18 |
| 3 | 7 | 11 | 15 | 19 |
| 0 | 16 | 13 | 10 | 7 |
| 4 | 1 | 17 | 14 | 11 |
| 8 | 5 | 2 | 18 | 15 |
| 12 | 9 | 6 | 3 | 19 |
| 0 | 7 | 14 | 2 | 9 |
| 16 | 4 | 11 | 18 | 6 |
| 13 | 1 | 8 | 15 | 3 |
| 10 | 17 | 5 | 12 | 19 |
| 0 | 9 | 18 | 8 | 17 |
| 7 | 16 | 6 | 15 | 5 |
| 14 | 4 | 13 | 3 | 12 |
| 2 | 11 | 1 | 10 | 19 |
| 0 | 17 | 15 | 13 | 11 |
| 9 | 7 | 5 | 3 | 1 |
| 18 | 16 | 14 | 12 | 10 |
| 8 | 6 | 4 | 2 | 19 |
| 0 | 11 | 3 | 14 | 6 |
| 17 | 9 | 1 | 12 | 4 |
| 15 | 7 | 18 | 10 | 2 |
| 13 | 5 | 16 | 8 | 19 |
| 0 | 6 | 12 | 18 | 5 |
| 11 | 17 | 4 | 10 | 16 |
| 3 | 9 | 15 | 2 | 8 |
| 14 | 1 | 7 | 13 | 19 |
| 0 | 5 | 10 | 15 | 1 |
| 6 | 11 | 16 | 2 | 7 |
| 12 | 17 | 3 | 8 | 13 |
| 18 | 4 | 9 | 14 | 19 |
| 0 | 1 | 2 | 3 | 4 |
| 5 | 6 | 7 | 8 | 9 |
| 10 | 11 | 12 | 13 | 14 |
| 15 | 16 | 17 | 18 | 19 |
| 0 | 4 | 8 | 12 | 16 |
| 1 | 5 | 9 | 13 | 17 |
| 2 | 6 | 10 | 14 | 18 |
| 3 | 7 | 11 | 15 | 19 |

FIG. 13

VIRTUAL DEVICE BUFFER FOR EMBEDDED DEVICE

This application claims the benefit of provisional U.S. Application Ser. No. 60/696,187, entitled “VDB THEORY AND OPERATION” filed on Jun. 29, 2005, assigned to the assignee of the present application, and incorporated herein by reference in its entirety for all purposes.

COPYRIGHT NOTICE

This patent document contains information subject to copyright protection. The copyright owner has no objection to the facsimile reproduction by anyone of the patent document or the patent, as it appears in the US Patent and Trademark Office files or records, but otherwise reserves all copyright rights whatsoever.

FIELD OF THE DISCLOSURE

The present disclosure relates to memory structures for transferring image frames to a display of an embedded device. Aspects of this disclosure relate to providing, on an image display processor chip of an embedded device, an interim buffer from which pixels are rendered to a display device.

BACKGROUND

Various types of embedded devices include a main memory portion, which holds image frames. The image frames held by the frame buffer in the main memory are sent to a display via an image display processor chip. The image display processor chip may include a mechanism to manipulate the positions of pixels within the image before the image is sent to the display. For example, the image may be rotated. This may be done by manipulating the pixels, i.e., moving the pixels, and storing the resulting manipulated image in a buffer within the main memory before sending the manipulated pixels to the display. Alternatively, or in addition, the resulting manipulated image may be stored within a buffer that is part of the display processor chip.

Embedded systems, for example, mobile phones, have limited memory resources. A given embedded system may have a main memory and a system bus, both of which are shared by different hardware entities, including an image processing chip. Meanwhile, the embedded system image processing chip may require large amounts of bandwidth of the main memory via the system bus.

Memory bandwidth demands like this can result in a memory access bottleneck, which could delay the operation of the video processing chip as well as other hardware entities that use the same main memory and system bus.

To reduce this bottleneck, on-chip memory may be provided within the image processing chip, and the image processing chip may place the manipulated image in this on-chip memory. However, increasing the amount of memory within the image processing chip consumes the resources of the chip, possibly also increasing the cost of the chip.

BRIEF SUMMARY OF THE DISCLOSURE

Apparatus are provided, including an embedded display processor on a given chip. The apparatus may be an embedded device, for example, a mobile wireless communications device. More specifically, the apparatus may be a mobile phone, a portable gaming device, a video streaming device, or a GPS map drawing device.

The display processor includes, on the same given chip, a rendering memory, from which pixels are rendered to a display device.

The display processor further includes an image manipulation mechanism to manipulate pixels of a given image frame from source positions in a pre-manipulation buffer, to target positions in the rendering memory, the target positions corresponding to rendered positions in the given image frame.

The display processor further includes a fetch mechanism to fetch, from the pre-manipulation buffer, a predetermined number of neighboring pixels including adjacent cross-row pixels traversing a plurality of rows while in their source positions, the adjacent cross-row pixels being intended for target positions in a common row in accordance with the manipulation to be performed by the manipulation mechanism.

The display processor further includes a send mechanism to send, from the rendering memory, a set of the neighboring pixels to the display device in accordance with a given dynamic refresh rate and scheme. The set of the neighboring pixels include adjacent common row pixels on a common row after having been manipulated.

The display processor further includes a reconfigure mechanism to periodically reconfigure a manner of assignment of addresses and physical locations for data stored in the rendering memory.

BRIEF DESCRIPTION OF THE DRAWINGS

Embodiments of the disclosure are further described in the detailed description, which follows, by reference to the noted drawings, in which like reference numerals represents similar parts throughout the several views of the drawings, and wherein:

FIG. 13 is a schematic diagram of a scheme to manage address assignments in the rendering memory.

DETAILED DESCRIPTION

Figure 1:
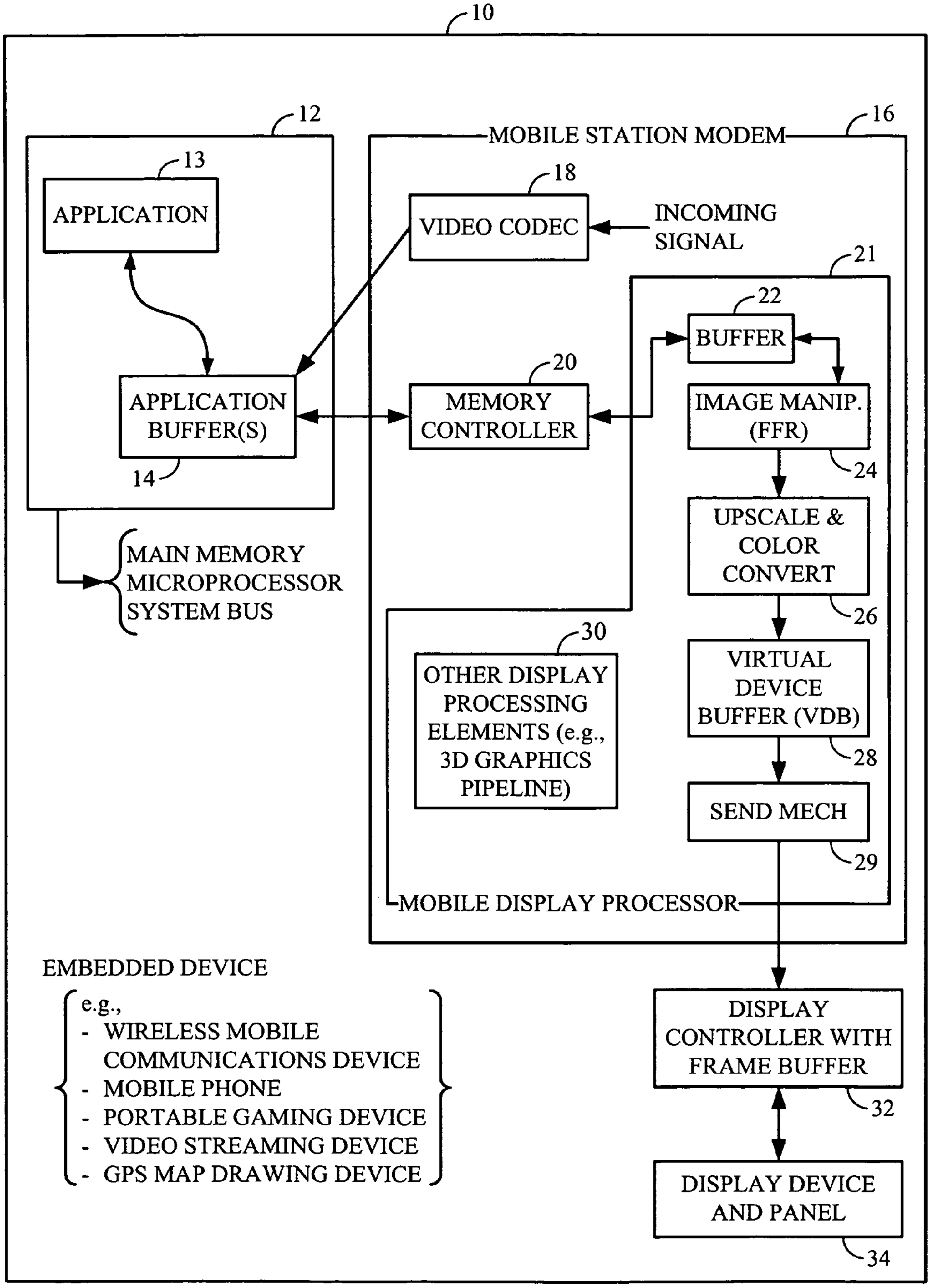
FIG. 1 is a block diagram of an embedded device.

Referring now to the drawings in greater detail, FIG. 1 shows an embedded device 10. The illustrated embedded device 10 may include, for example, a wireless mobile communications device. The illustrated device includes system-side elements 12, a mobile station modem (MSM) chip 16, a display controller with a frame buffer 32, and a display device and panel 34. The illustrated system-side elements 12 include, among other elements not specifically shown, an application 13 coupled to one or more application buffers 14, each of which generally is a frame buffer for holding pixel data associated with images to be displayed ultimately on display device and panel 34. Images to be displayed, which may include video images, may be generated by application 13 or by transmitted image signals from an incoming signal decoded by a video codec 18 of mobile station modem chip 16.

Mobile station modem chip 16 further includes, in addition to video codec 18, a memory controller 20 and a mobile display processor 21. The illustrated mobile display processor 21 includes a buffer 22, an image manipulation mechanism 24, an upscale and color convert mechanism 26, a virtual device buffer 28, a send mechanism 29, and other display processing elements 30 (for example, a 3-D graphics pipeline).

The illustrated mobile display processor 21 may be part of a larger integrated circuit or chip, it may be a separate processor chip, or it may be part of an overall system on a chip (SoC). The display processor 21 includes, on the same chip, a rendering memory, which is a virtual device buffer (VDB) 28 in the embodiment shown in FIG. 1. Pixels are rendered from the rendering memory to a display device, which includes display device and panel 34, external to the chip of the display processor 21. The rendering memory stores pixels in a native format of the display device. More specifically, as in the illustrated embodiment, the rendering memory stores pixels in a native format of the display device frame buffer, which may be a frame buffer of a liquid crystal display (LCD) panel. In other embodiments not discussed in detail herein, the display device, which may or may not have a frame buffer, could be an OLED, other future displays, or a television screen, to name a few examples.

The image manipulation mechanism 24 may include a fetch, flip and rotate (FFR) mechanism to reposition pixels from source positions in a pre-manipulation buffer (application buffer(s) 14 in the illustrated embodiment). The source positions correspond to positions in a given image. The pixels are repositioned as they are moved to target positions in the rendering memory (virtual device buffer 28 in the illustrated embodiment). That manipulation may include, for example, rotation of the image.

The illustrated display processor 21 further includes a fetch mechanism to fetch, from the pre-manipulation buffer (application buffer(s) 14 as illustrated) a predetermined number of neighboring pixels. In the illustrated embodiment, the fetch mechanism includes memory controller 20.

The neighboring pixels that are fetched include adjacent cross-row pixels traversing a plurality of rows while in their source positions. The adjacent cross-row pixels may be intended for target positions in a common row in accordance with the manipulation to be performed by the manipulation mechanism. For example, if the manipulation mechanism is performing a rotation on the image, the adjacent cross-row pixels being fetched may end up, for example, as common-row pixels when the rotation is a clockwise rotation of 90 degrees.

A send mechanism 29 may be provided, to send, from the rendering memory, a predetermined number of neighboring pixels, including adjacent common-row pixels on a common row after having been manipulated, in the case where, for example, the image was rotated in one direction by 90 degrees.

The neighboring pixels are sent to the display device in accordance with a given dynamic refresh rate and scheme. In the illustrated embodiment, send mechanism 29 includes features to send data using a follow-the-beam approach, whereby the contents of the frame buffer (in this case the rendering memory) are updated as the content for the same location within the frame has been sent to the display. The send mechanism may be part of the mobile display processor chip, which is also part of the same mobile station modem chip 16, in the illustrated embodiment.

The illustrated mobile display processor 21 may further include a reconfigure mechanism 31 to periodically reconfigure the manner in which addresses and physical locations are allocated to the data stored in the rendering memory (virtual device buffer 28) as room within the rendering memory becomes available for additional data.

Figure 2:
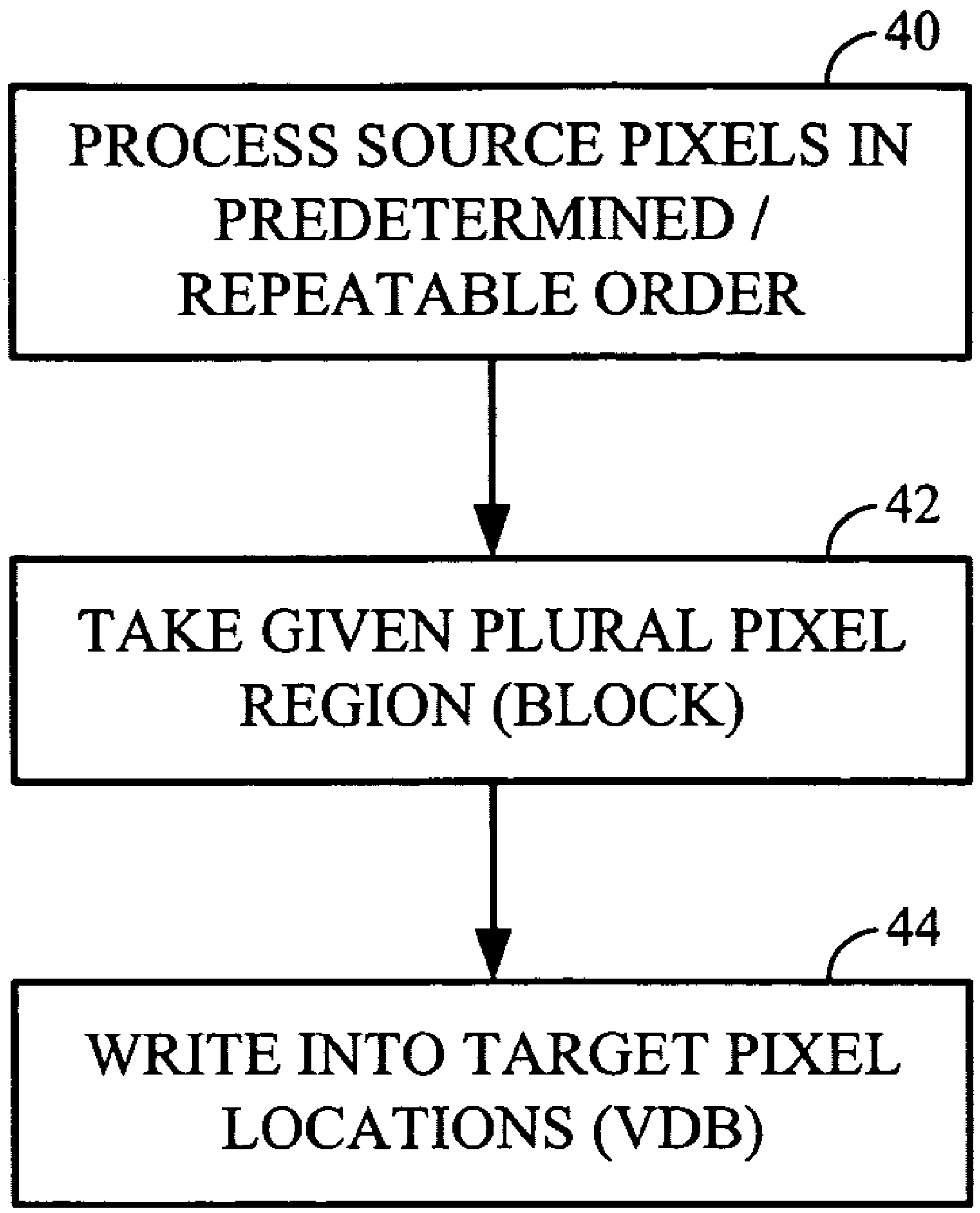
FIG. 2 is a flow chart of a process for moving image pixels from a source location to a target location in a rendering memory.

FIG. 2 is a flow chart of a general process for moving image pixels from a source location in one or more application buffers to a target location in a rendering memory. In act 40, source pixels are processed in a predetermined, repeatable order. As part of the processing referred to in act 40, in act 42, a given plural pixel region is selected. In the illustrated embodiment, the plural pixel region selected from the source pixels is a block. The block may be a square block. In one example embodiment, the block is, in a least one direction, a multiple of the number of bytes in a memory read burst of the memory controller used to read data from the applicable source memory. In one embodiment, the number of pixels in each direction forming a square block is 16.

In act 44, the pixels from the given plural pixel region are written into the target pixel locations. In the illustrated embodiment, the target pixel locations are locations within a rendering memory, which specifically is virtual device buffer 28.

As the source pixels are processed, before they are stored in the rendering memory, the pixel data is translated to an appropriate device space corresponding to the ultimate display device to be used to display the image.

In act 44, the process of writing pixels into the target locations includes manipulating the source pixels of the given region, which may include, for example, rotating or flipping of those pixels before placing them into the target locations.

Figure 7:
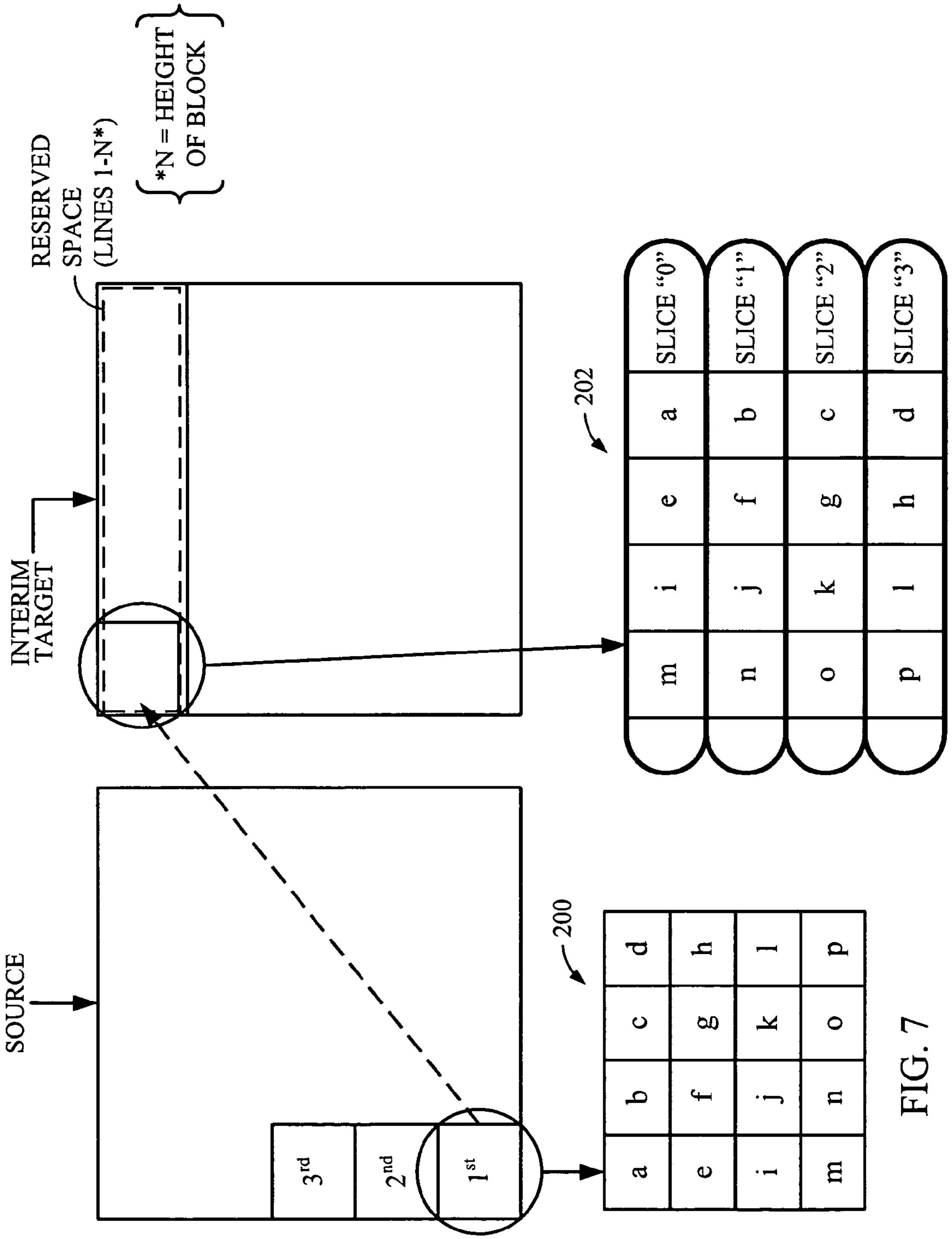
FIG. 7 is a schematic block diagram illustrating a source memory and an interim target memory.

As shown in act 40 in FIG. 2, the source pixels are processed in a predetermined, repeatable order. Accordingly, in the example, when the source pixels are manipulated, the circled first block in the source memory in FIG. 7 is manipulated; and thereafter the second circled block is manipulated; and so on. The first source block includes pixels a, b, c, d . . . , m, n, o, p.

Figure 3:
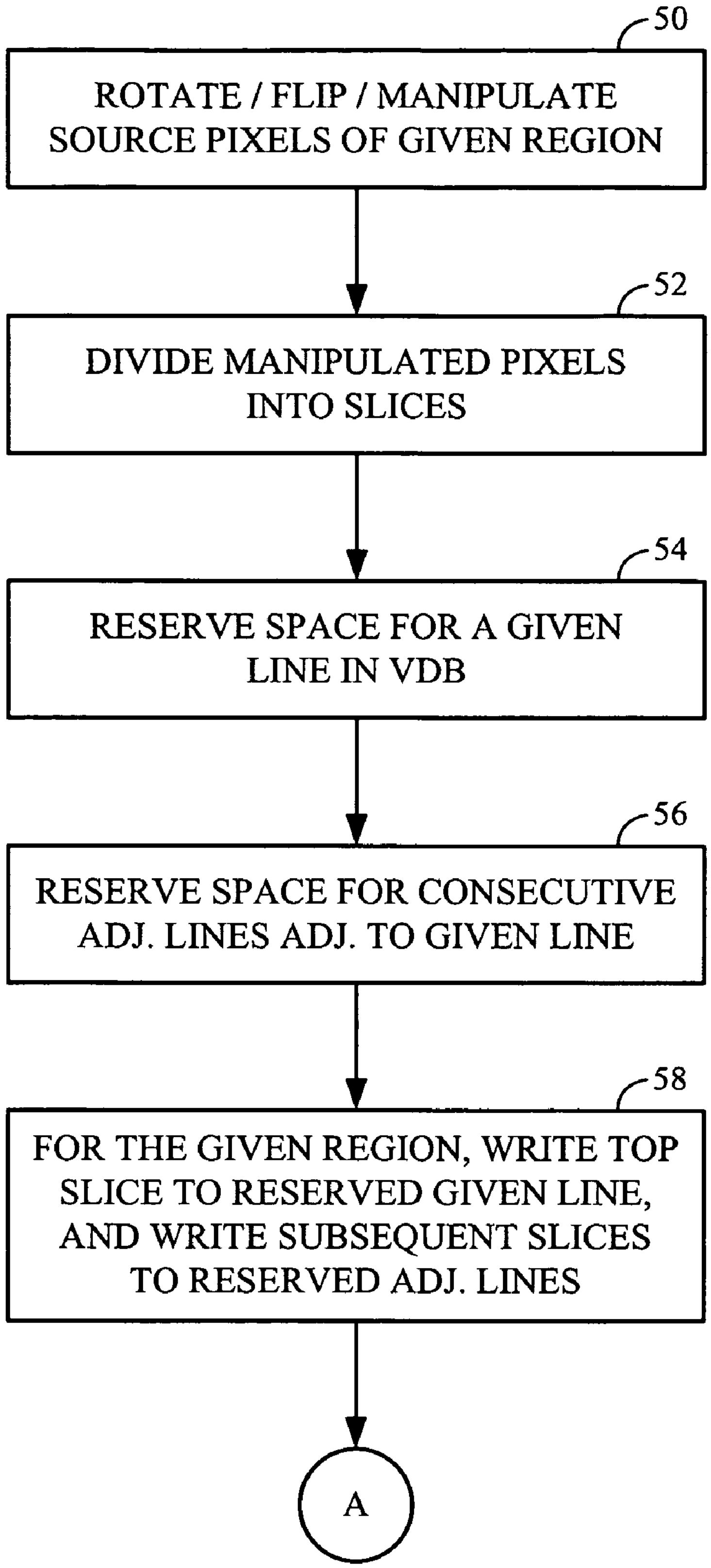
FIGS. 3-5 collectively show a flow chart of a process for moving data into target pixel locations of a virtual device buffer (VDB) serving as a rendering memory.

FIG. 3 is a flow chart of a process for writing pixels from the source memory to the rendering memory, otherwise referred to herein as an interim target memory. Simplified versions of a source memory and interim target memory are shown in FIG. 7.

In act 50, the source pixels of a given region within the source image are manipulated. For example, they are rotated and/or flipped.

In the example shown in FIG. 7, the given region is a four pixel by four pixel block 200. (Address locations in the memories in FIG. 7 are positioned in accordance with pixel positions in the resulting image.) In that example, the source image is rotated by 90 degrees clockwise as it is written into the interim target memory. Accordingly, the source pixels 200 of a given region are manipulated and moved to target pixels 202 comprising the same region, albeit rotated by 90 degrees clockwise. As shown in FIG. 7, source block 200 has, in its top row, pixels a, b, c, and d. In the 90 degrees clockwise rotated target block 202, those same pixels now traverse four different rows. Before rotation, those pixels were within a common row.

In act 52, in FIG. 3, the manipulated pixels are divided into slices. For example, as shown in FIG. 7, the target block 202 is divided into slices “0”, “1”, “2”, and “3”. Each of those slices corresponds to the portions of the given region (a block in the illustrated embodiment) which will be on respective adjacent lines when displayed.

In act 54, space is reserved for a given line in the interim target memory. The reserved lines span the width of the display screen (in pixels). In act 56, space is reserved for consecutive adjacent lines adjacent to the given line, resulting in a total reserved space for lines 1-N. N is equal to the height of the blocks. In the illustrated embodiment, a block is four pixels high and four pixels wide, in terms of the pixel positions as manipulated and as stored in the interim target memory. Addresses are logically assigned to the reserved space, so the reserved space can be filled in the correct order, and so that the data can be sent in consecutive lines in a manner that is consistent with a follow-the-beam process.

In act 58, for the given region (a four by four pixel block in the illustrated embodiment) the top slice of that region (slice 0) is written to the reserved given line, and subsequent slices (1, 2, 3) are written to the respective subsequent reserved adjacent lines.

Figure 4:
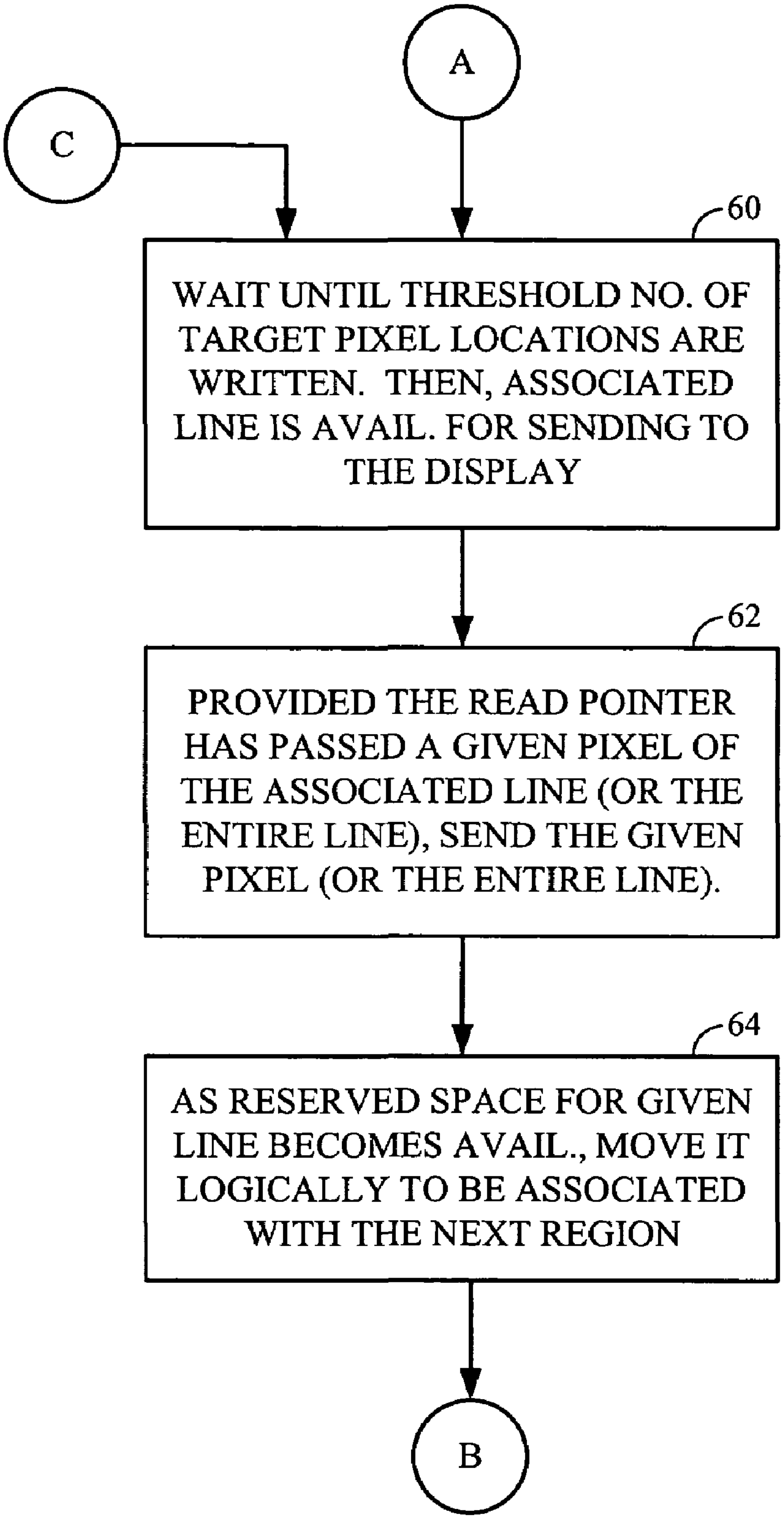

In act 60, which is shown at the top of FIG. 4, additional regions are written into the reserved space, and the process waits until a threshold number of target pixel locations are written for a line of interest in the interim target. In the specific embodiment illustrated, the threshold number of target pixel locations corresponds to a number of blocks written into the interim target memory that span the width of the screen. In the illustrated embodiment, which is simplified for purposes of illustration herein, the entire width of the screen is 5 blocks wide. In an actual implementation, the width of the screen may be, for example, 352 pixels wide for a CIF format, 640 pixels wide for VGA, or 320 pixels wide for QVGA. Once the threshold target pixel locations are written for a line of interest in the interim target memory, the line of interest is available for sending to the display, i.e., for sending to the display's frame buffer. In act 62, when the read pointer has passed a given pixel of the associated line (or the entire line), the given pixel (or the entire line of interest) is sent the display.

In a next act 64, as the physical space in the interim target for the given line becomes available (i.e., because its data has been sent to the display), it is reassociated with new addresses corresponding to the next region to be transferred from the source memory to the interim target. This is explained in an example below with reference to FIGS. 8-12.

In act 64, as more reserved space for the given line becomes available, it is moved logically and associated with a next region to be transferred from the source memory.

Figure 5:
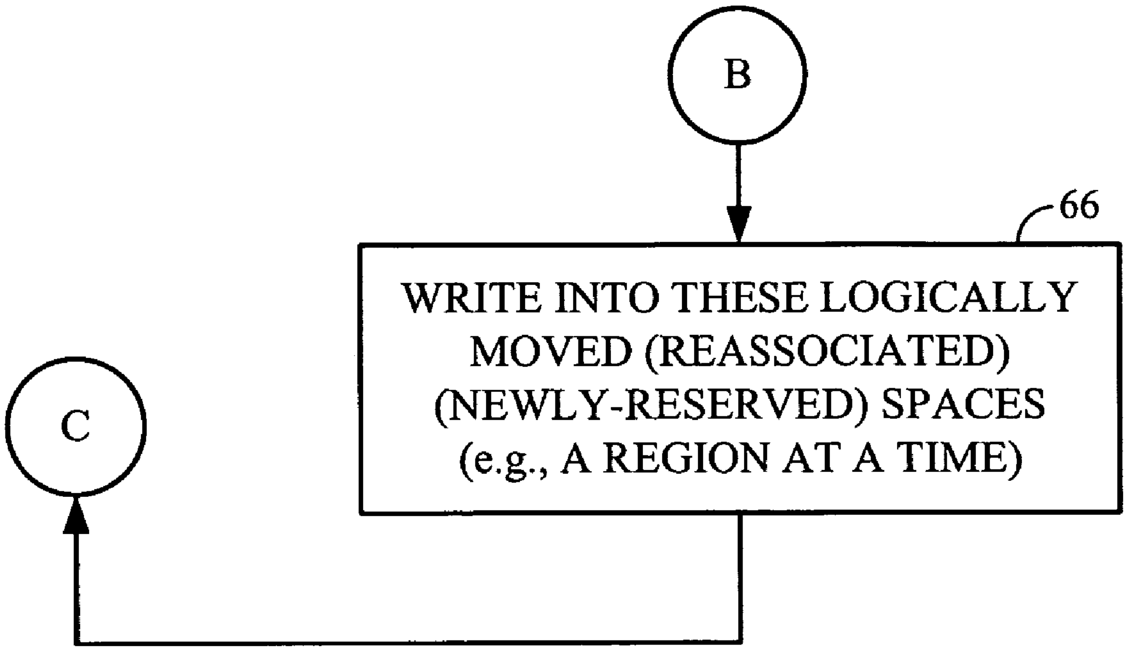

At act 66, which is shown at the top of FIG. 5, data is written from a source memory into the target memory, in to these logically moved (reassociated/newly-reserved) spaces. For example, this may be done one region at a time. In the illustrated embodiment, this is done a block at a time. That is, as a region becomes available in the target memory, the pre-manipulation source locations corresponding to that region are manipulated and transferred from the source locations into the target locations.

Figure 6:
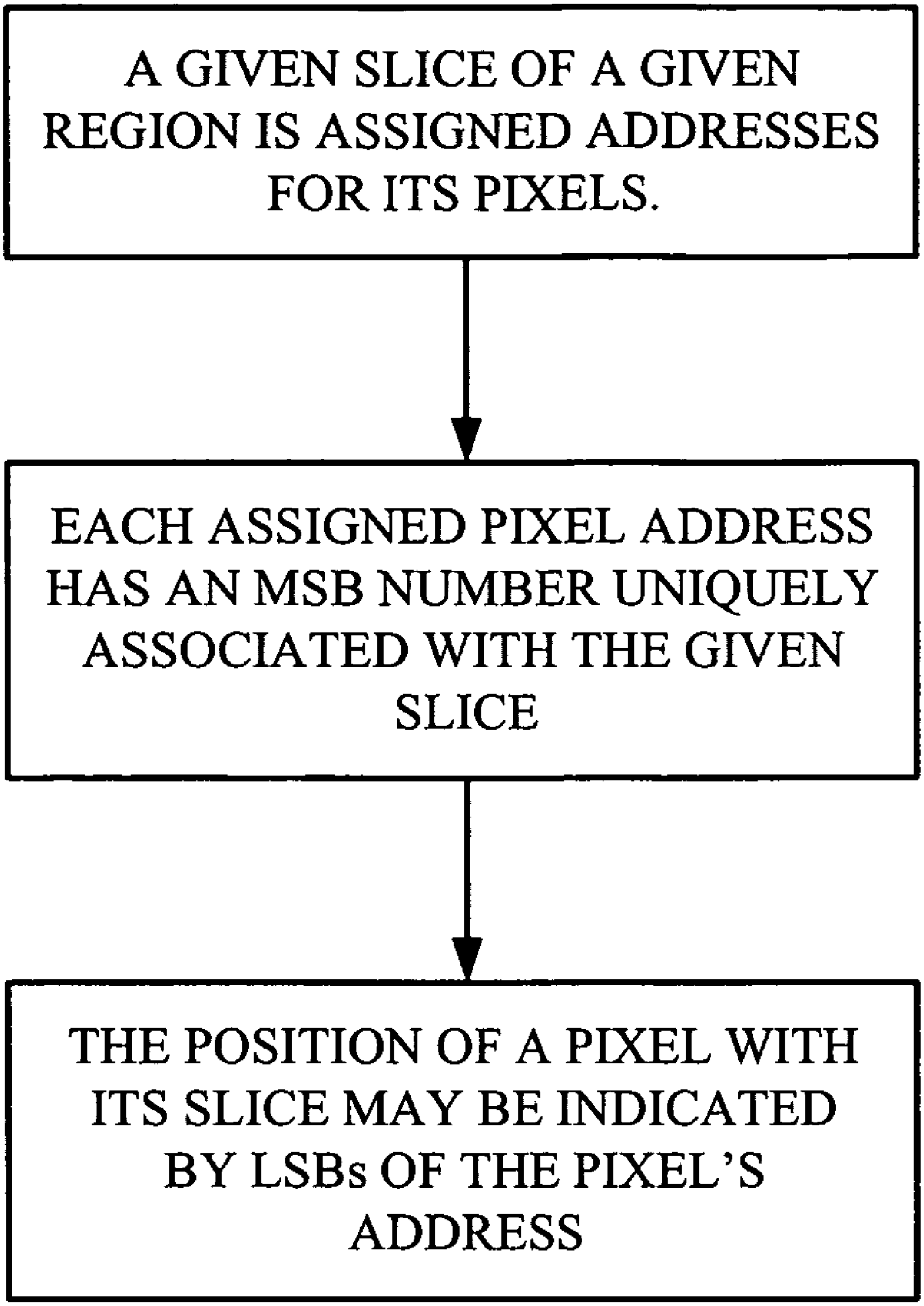
FIG. 6 is a schematic diagram illustrating the manner in which addresses are associated with pixel data within the rendering memory.

FIG. 6 shows the manner in which a given slice of a given region is given addresses for its pixels. An assigned pixel address for a given pixel in the interim target memory has a most significant bit (MSB) number uniquely associated with a particular slice containing the given pixel. The position of a pixel within its slice may be indicated by the least significant bits (LSBs) of the pixel's address. Thus, for example, slice 2 in the example (which is the 3$^{rd}$ slice of the first four by four block 202, as shown in FIG. 7) may have pixel addresses as follows (in terms of the interim target addresses) [001000, 001001, 001010, 001011].

In the example illustrated in FIG. 7, the physical size of the virtual device buffer is 20 pixels wide and four lines deep. The amount of space required for each pixel depends upon the particular format of the image display processor. For example, some pixels in some systems require a given number of bytes of data storage, while others may require a different amount of space. In the case of a CIF video format, the virtual device buffer may, for example, be 352 pixels wide and 16 pixels deep. For a VGA type of display format, the virtual device buffer may, for example, be 640 pixels wide and 16 pixels deep. For a QVGA video format, the VDB may, for example, be 320 pixels wide and 16 pixels deep. In each of these specific examples, if the given region is a block, the block size, may, for example, be 16 pixels by 16 pixels.

As noted above, as individual lines becomes free, i.e., the data for those lines have already been sent to the display, within the virtual device buffer, the slice locations for those lines can be reassociated with unique addresses so that they can accept data for subsequent source pixels.

FIGS. 8-12 show graphic representations of the relationship between logical addresses of the interim target memory and the manner in which blocks can be stored in the interim target memory and associated with those logical addresses. This is done in a manner that allows a small amount of physical memory space in interim target memory. In the examples shown in FIGS. 8-12, the example interim target memory is simplified to span a total of 20 pixels in width, with 4 pixels in depth.

Figure 8:
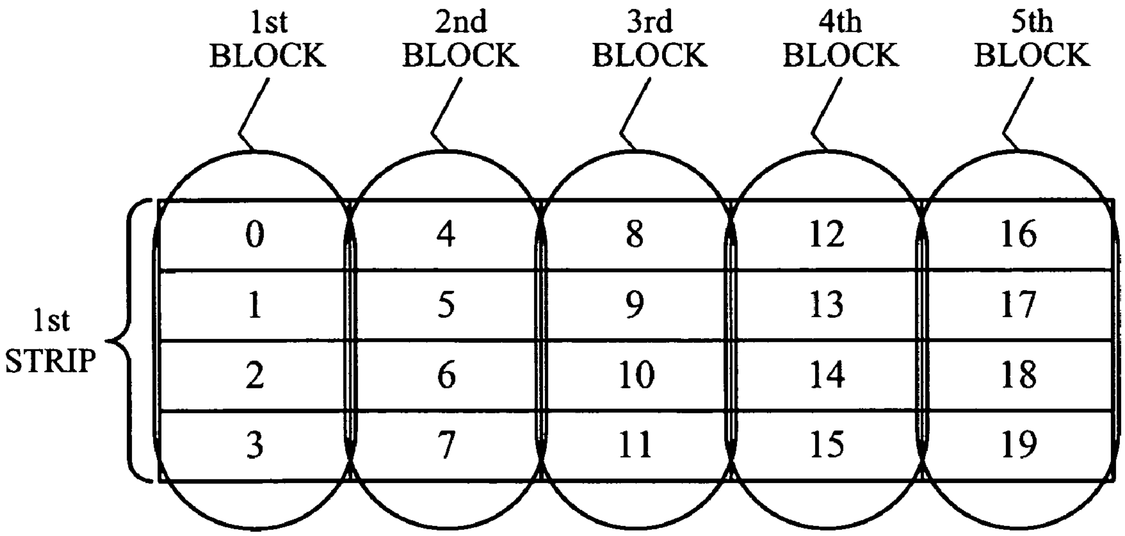
FIGS. 8-12 are schematic diagrams of changing memory address assignments in a rendering memory.

As shown in FIG. 8 the first block, when stored in the interim target memory, includes slices 0, 1, 2, and 3. The second block, when stored in the interim target memory, includes slices 4, 5, 6, and 7. After the second block is read into the interim target memory, the third block is read in, which includes slices 8, 9, 10, and 11. The fourth block includes slices 12, 13, 14, and 15. The fifth block includes slices 16, 17, 18, and 19.

After five blocks are written into the example simplified interim target memory, it is now full, and the first line is available to be sent to the display. In other words, a given line in the interim target memory is not sent to the interim target, in the illustrated embodiment, until it is completely filled with data from the source. Since the data is written one block at a time, in the illustrated example, this requires that the first five blocks will have been written into the interim target memory. Once the read pointer (not shown) has passed line 1, line 1 is sent to the display.

A block, in this example, requires 4 slices, and now (after line 1 has been sent to the display) 5 empty slices are available, specifically, slices 0, 4, 8, 12, and 16 from which data has been sent to the display. Accordingly, the virtual address assignment for the physical spaces associated with these slices will remain the same, but those same addresses will be reserved to accept incoming data read from the source memory in a different order. The order in which the data is now accepted for a next block from the source memory is dictated by the positions at which these addresses are now located in FIG. 9. Specifically, a next block, specifically a 6$^{th}$ block, is written into slices 0, 4, 8 and 12 which are now vertically positioned under and subsequent to slices 1, 2, and 3 in the interim target memory.

In the illustrated embodiment, slice addresses 0, 4, 8, and 12 still correspond to the same physical locations within the memory, but they now correspond to the block data in a different way. Whereas, previously, slice locations 0, 1, 2, and

3 corresponded to a common block, now slice locations 0, 4, 8, and 12, incremented by 4, correspond to a next common block.

Figure 10:
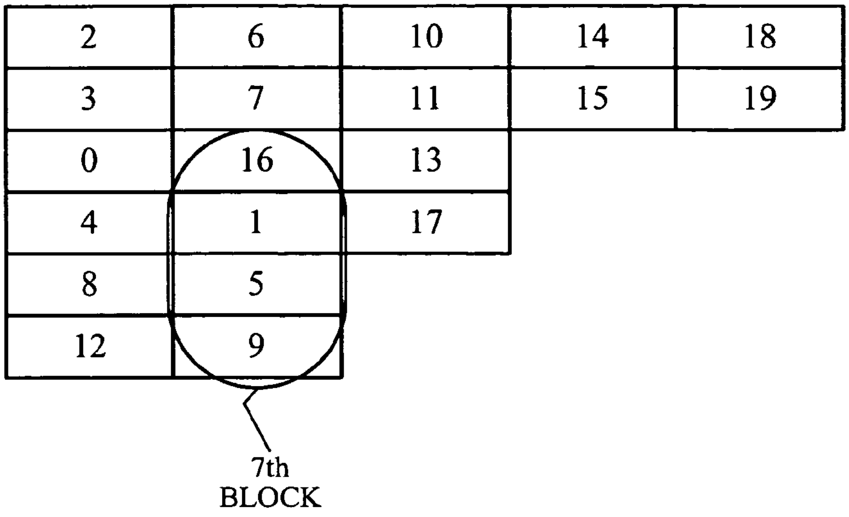
Figure 11:
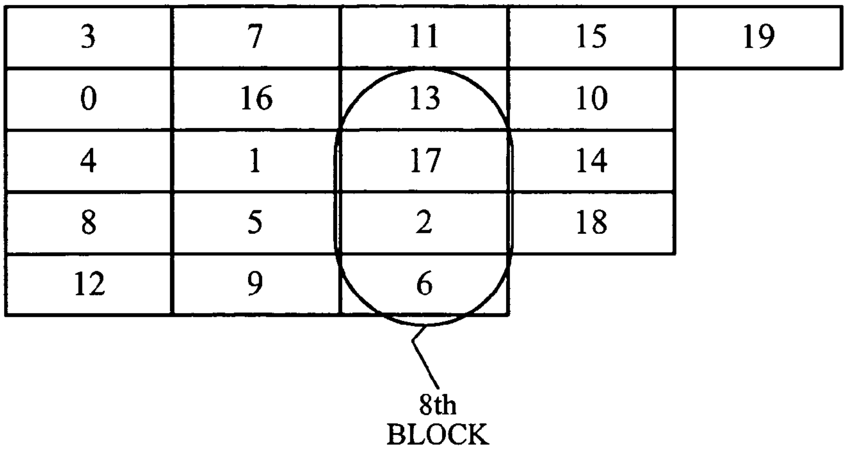
Figure 12:
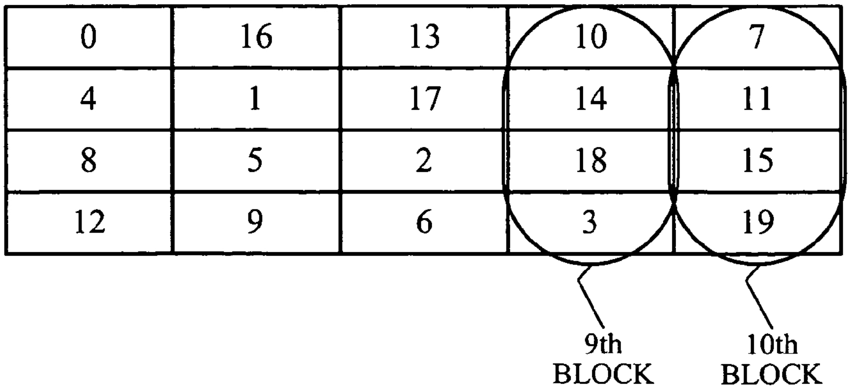

FIG. 10 shows that the $7^{th}$ block now corresponds to slices 16, 1, 5 and 9. As shown in FIG. 11 the $8^{th}$ block now correspond to slices 13, 17, 2, and 6. As shown in FIG. 12, the $9^{th}$ and $10^{th}$ blocks now are stored in slices 10, 14, 18, and 3 (for the $9^{th}$ block) and 7, 1, 15, and 19 (for the $10^{th}$ block).

Figure 9:
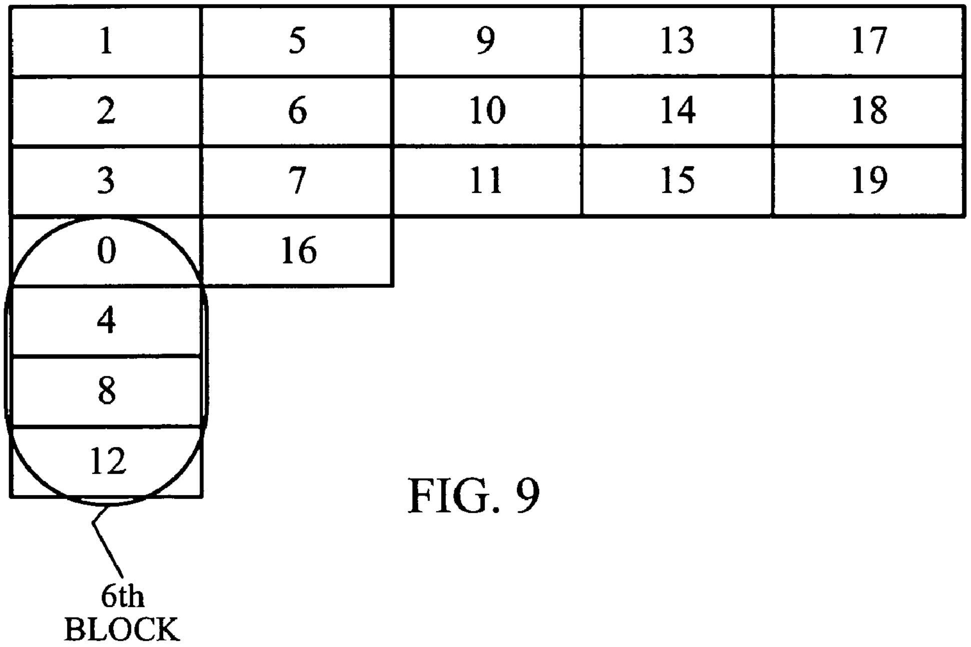

As shown in FIG. 9, the top line, from which the data has already been sent to the display, is used for the next block. As the next line of data is ready to be sent to the display, which corresponds to slices 1, 5, 9, 13, and 17 as shown in FIG. 9, a next line is now available for storage of additional block data from the source memory. Accordingly, that memory space is reconfigured to be used for the next blocks, as shown in FIG. 10.

As shown in FIGS. 9-12, and as discussed above, the interim target memory, which serves as virtual device buffer, can be simultaneously filled and dumped. This provides a block-to-line first in first out (FIFO) effect.

FIG. 13 shows the manner in which the various memory locations within the interim target memory can be reconfigured. As described above, the first block was sent to slices 0, 1, 2, and 3. This continued until the fifth block was sent to the interim target memory, at which point the top row of the interim target memory was filled with data spanning an entire line, which would therefore be allowed to be sent to the display, once the pointer has passed that same location for the display. This complete set of blocks spanning the entire width of the interim target memory may be referred to as a stripe. Each stripe includes 5 blocks, and each block includes 4 slices. Each slice includes, in the example, 4 pixels. The first block of the first stripe was sent to slices 0, 1, 2, and 3. The first block of the second stripe was sent to slices 0, 4, 8, and 12. The first line of the first stripe was read out of slices 0, 4, 8, 12, and 16, and the first line of the second stripe was read out of slices 0, 16, 13, 10 and 7.

As shown in FIG. 13, each different stripe is separately delineated with a thick horizontal line. Note that the diagram of the interim target memory does not correspond to actual physical space, since the physical interim target memory in the example is limited to a maximum amount of memory of 20 pixels across and 4 pixels down.

The reconfiguration scheme illustrated in FIG. 13 can be implemented with an increment value followed by a simple modulo function. The addresses of the slices of the left-most block increase in increments by one in the top stripe. The increments are by four in the next stripe. The address then increments by sixteen in the third stripe. Note that the sequence [0, 16, 32, 48] MOD 19=[0, 16, 13, 10]. All of the reconfigured address sequences corresponding to each of the stripes in FIG. 13 are a linear sequence mod 19. The "19" is the number of blocks times the number of slices per block minus one. This is the modulo factor for the reconfiguration scheme illustrated in FIG. 13.

The increment value is the number of slices per block raised to the nth (where n is the stripe number) modulo 19. These numbers can be computed by taking a previous increment value and multiplying that by the slices per block, and applying that result to the modulo function.

The block writing address order in this scheme shown in FIG. 13 "follows" the line reading order. In other words, the same address generator can be used for input and output. Two separate instantiations may be used for the address generators, but the same logic may be used. The read address generator may be bumped once at reset so it starts off generating the 0, 4, 8, . . . sequence.

Note that the bottom stripe in the reconfiguration scheme as shown in FIG. 13 has the same addressing sequence as the top stripe. While the sequence repeats in the illustrated embodiment, other embodiments may incorporate a reconfiguration scheme where the addressing sequence does not repeat.

The claims as originally presented and as they may be amended, encompass variations, alternatives, modifications, improvements, equivalents and substantial equivalents of the embodiments and teachings disclosed herein, including those that are presently unforeseen or unappreciated, and that, for example, may arise from applicants/patentees and others.

What is claimed is:

1. An apparatus comprising:

an embedded display processor on a given chip;

the display processor including, on the same given chip, a rendering memory from which pixels are rendered to a display device;

the display processor further including an image manipulation mechanism to manipulate pixels of a given image frame from source positions in a separate pre-manipulation buffer to target positions in the rendering memory, the target positions corresponding to the rendered positions in the given image frame;

the display processor further including a fetch mechanism to fetch, from the pre-manipulation buffer, a predetermined number of neighboring pixels within a first block, including adjacent cross-row pixels traversing a plurality of rows while in their source positions, the adjacent cross-row pixels being intended for target positions in a common row of the rendering memory in accordance with the manipulation to be performed by the manipulation mechanism;

the display processor further including a send mechanism to send, from the rendering memory, a set of (the neighboring pixels within the first block to the display device in accordance with a given dynamic refresh rate and scheme, the set of the neighboring pixels including adjacent common row pixels in the common row after having been manipulated;

the display processor further including a reconfigure mechanism to reconfigure a manner of assignment of addresses and physical locations for data stored in the rendering memory, wherein the fetch mechanism fetches a second predetermined number of neighboring cross-row pixels within a second, different block from the pre-manipulation buffer, which are intended for target positions assigned by the reconfigure mechanism in another, different row of the rendering memory in accordance with a second, different manipulation performed by the manipulation mechanism, while the send mechanism sends the set of the neighboring pixels within the first block from the rendering memory to the display device, such that the rendering memory is simultaneously filled and dumped, wherein the first block is part of a first group of blocks that, when displayed, span an entire width of a display of the display device, each block in the first group comprising multiple pixel slices that each contain a plurality of pixels, wherein the second, different block is part of a second, different group of blocks that, when displayed, span the entire width of the display of the display device, each block in the second group comprising multiple pixel slices that each contain a plurality of pixels, and wherein after one pixel slice from each block in the first group has been sent from one row of physical space in the rendering memory to the display device, the reconfigure mechanism reserves at least part of the one row of physical space for the pixel slices of the second block, such that each pixel slice of the second block becomes newly associated with a unique slice address that was previously associated with one of the pixel slices from one of the blocks in the first group that was sent to the display device.

2. The apparatus according to claim 1, wherein the given chip is a system on a chip.

3. The apparatus according to claim 1, wherein the rendering memory includes a buffer.

4. The apparatus according to claim 3, wherein the rendering memory is a virtual device buffer.

5. The apparatus according to claim 1, wherein the display device is a liquid crystal display and includes a frame buffer.

6. The apparatus according to claim 1, wherein the display processor further includes an interim buffer preceding the image manipulation mechanism.

7. The apparatus according to claim 1, wherein the manipulation mechanism includes a fetch, flip, and rotate mechanism.

8. The apparatus according to claim 1, wherein the manipulation mechanism repositions pixels from source positions in the pre-manipulation buffer to target positions in the rendering memory.

9. The apparatus according to claim 1, wherein the manipulation of the pixels includes a rotation in the target positions in relation to the source positions.

10. The apparatus according to claim 1, wherein the pre-manipulation buffer includes an application buffer in system memory or a buffer in the display processor.

11. The apparatus according to claim 1, wherein the neighboring pixels include a slice of pixels equal to a given number of contiguous pixels.

12. The apparatus according to claim 1, wherein the fetch mechanism fetches blocks, including the first and second blocks, each block being a number of pixels wide and a number of pixels deep.

13. The apparatus according to claim 1, wherein the refresh rate and scheme includes a follow-the-beam approach.

14. The apparatus according to claim 1, wherein the reconfigure mechanism periodically reconfigures space in the rendering memory as soon as there is room in the rendering memory for the second block.

15. The apparatus according to claim 1, wherein the reconfigure mechanism periodically reconfigures space in the rendering memory as soon as there is room in the rendering memory for a new group of blocks spanning the entire width of the display of the display device.

16. The apparatus according to claim 1, wherein the fetch mechanism fetches the second predetermined number of neighboring cross-row pixels within the second, different block from the pre-manipulation buffer while the send mechanism sends the set of the neighboring pixels within the first block from the rendering memory to a frame buffer of the display device.

17. A method comprising:

providing, in an embedded display processor on a given chip, a rendering memory from which pixels are rendered to a display device;

manipulating pixels of a given image frame from source positions in a separate pre-manipulation buffer to target positions in the rendering memory, the target positions corresponding to the rendered positions in the given image frame;

fetching from the pre-manipulation buffer, a predetermined number of neighboring pixels within a first block, including adjacent cross-row pixels traversing a plurality of rows while in their source positions, the adjacent cross-row pixels being intended for target positions in a common row of the rendering memory in accordance with the manipulation to be performed by a manipulation mechanism;

sending, from the rendering memory, a set of the neighboring pixels within the first block to the display device in accordance with a given dynamic refresh rate and scheme, the set of the neighboring pixels including adjacent common row pixels in the common row after having been manipulated;

reconfiguring addresses for data stored in the rendering memory by a reconfigure mechanism; and while sending the set of the neighboring pixels within the first block from the rendering memory to the display device, fetching a second predetermined number of neighboring cross-row pixels within a second, different block from the pre-manipulation buffer, which are intended for target positions assigned by the reconfigure mechanism in another, different row of the rendering memory in accordance with a second, different manipulation performed by the manipulation mechanism, such that the rendering memory is simultaneously filled and dumped, wherein the first block is part of a first group of blocks that, when displayed, span an entire width of a display of the display device, each block in the first group comprising multiple pixel slices that each contain a plurality of pixels, wherein the second, different block is part of a second, different group of blocks that, when displayed, span the entire width of the display of the display device, each block in the second group comprising multiple pixel slices that each contain a plurality of pixels, and wherein after one pixel slice from each block in the first group has been sent from one row of physical space in the rendering memory to the display device, the method further comprises reserving at least part of the one row of physical space for the pixel slices of the second block, such that each pixel slice of the second block becomes newly associated with a unique slice address that was previously associated with one of the pixel slices from one of the blocks in the first group that was sent to the display device.

18. The method according to claim 17, further comprising providing the given chip as part of a system on a chip.

19. The method according to claim 17, wherein the rendering memory includes a buffer.

20. The method according to claim 19, wherein the rendering memory is a virtual device buffer.

21. The method according to claim 17, wherein the display device is a liquid crystal display and includes a frame buffer.

22. The method according to claim 17, further comprising storing pixel data in an interim buffer before manipulating the pixel data.

23. The method according to claim 17, wherein the manipulation includes a fetch, flip, and rotate operation.

24. The method according to claim 17, wherein the manipulation includes repositioning pixels from source positions in the pre-manipulation buffer to target positions in the rendering memory.

25. The method according to claim 17, wherein the manipulation of the pixels includes a rotation in the target positions in relation to the source positions.

26. The method according to claim 17, wherein the pre-manipulation buffer includes an application buffer in a system memory or a buffer on the display processor chip.

27. The method according to claim 17, wherein the neighboring pixels include a slice of pixels containing a given number of contiguous pixels.

28. The method according to claim 17, wherein the fetching includes fetching blocks, including the first and second blocks, each block being a number of pixels wide and a number of pixels deep.

29. The method according to claim 17, wherein the refresh rate and scheme includes a follow-the-beam approach.

30. The method according to claim 17, wherein the reconfiguring includes periodically reconfiguring space in the rendering memory as soon as there is room in the rendering memory for the second block.

31. The method according to claim 17, wherein the reconfiguring includes periodically reconfiguring space in the rendering memory as soon as there is room in the rendering memory for a new group of blocks spanning the entire width of the display of the display device.

32. An integrated circuit comprising:

an embedded display processor;

the display processor including a rendering memory from which pixels are rendered to a display device, the rendering memory storing pixels in a native format of the display device;

an image manipulation circuit to manipulate pixels of a given image frame from source positions in a separate pre-manipulation buffer to target positions in the rendering memory, the target positions corresponding to the rendered positions in the given image frame;

a fetch circuit to fetch, from the pre-manipulation buffer, a predetermined number of neighboring pixels within a first block, including adjacent cross-row pixels traversing a plurality of rows while in their source positions, the adjacent cross-row pixels being intended for target positions in a common row of the rendering memory in accordance with the manipulation to be performed by the manipulation circuit;

a send circuit to send, from the rendering memory, a set of the neighboring pixels within the first block to the display device in accordance with a given dynamic refresh rate and scheme, the set of the neighboring pixels including adjacent common row pixels in the common row after having been manipulated; and a reconfigure circuit to reconfigure addresses available for data stored in the rendering memory, such that the fetch circuit fetches a second predetermined number of neighboring cross-row pixels within a second, different block from the pre-manipulation buffer, which are intended for target positions assigned by the reconfigure circuit in another, different row of the rendering memory in accordance with a second, different manipulation performed by the manipulation circuit, while the send circuit sends the set of the neighboring pixels within the first block from the rendering memory to the display device, such that the rendering memory is simultaneously filled and dumped, wherein the first block is part of a first group of blocks that, when displayed, span an entire width of a display of the display device, each block in the first group comprising multiple pixel slices that each contain a plurality of pixels, wherein the second, different block is part of a second, different group of blocks that, when displayed, span the entire width of the display of the display device, each block in the second group comprising multiple pixel slices that each contain a plurality of pixels, and wherein after one pixel slice from each block in the first group has been sent from one row of physical space in the rendering memory to the display device, the reconfigure circuit reserves at least part of the one row of physical space for the pixel slices of the second block, such that each pixel slice of the second block becomes newly associated with a unique slice address that was previously associated with one of the pixel slices from one of the blocks in the first group that was sent to the display device.

33. An apparatus comprising:

an embedded display processor on a given chip;

the display processor including, on the same given chip, a rendering memory from which pixels are rendered to a display device;

means for manipulating pixels from source positions in a separate pre-manipulation buffer to target positions in the rendering memory, the target positions corresponding to the rendered positions in a given image frame;

means for fetching, from the pre-manipulation buffer, a predetermined number of neighboring pixels within a first block, including adjacent cross-row pixels traversing a plurality of rows while in their source positions, the adjacent cross-row pixels being intended for target positions in a common row of the rendering memory in accordance with the manipulation to be performed by the means for manipulating;

means for sending, from the rendering memory, a set of the neighboring pixels within the first block to the display device in accordance with a given dynamic refresh rate and scheme, the set of the neighboring pixels including adjacent common row pixels in the common row after having been manipulated;

means for reconfiguring addresses used for data stored in the rendering memory; and while sending the set of the neighboring pixels within the first block from the rendering memory to the display device, means for fetching a second predetermined number of neighboring cross-row pixels within a second, different block from the pre-manipulation buffer, which are intended for target positions assigned during address reconfiguration in another, different row of the rendering memory in accordance with a second, different manipulation performed by the means for manipulating, such that the rendering memory is simultaneously filled and dumped, wherein the first block is part of a first group of blocks that, when displayed, span an entire width of a display of the display device, each block in the first group comprising multiple pixel slices that each contain a plurality of pixels, wherein the second, different block is part of a second, different group of blocks that, when displayed, span the entire width of the display of the display device, each block in the second group comprising multiple pixel slices that each contain a plurality of pixels, and wherein after one pixel slice from each block in the first group has been sent from one row of physical space in the rendering memory to the display device, the apparatus further comprises means for reserving at least part of the one row of physical space for the pixel slices of the second block, such that each pixel slice of the second block becomes newly associated with a unique slice address that was previously associated with one of the pixel slices from one of the blocks in the first group that was sent to the display device.

34. The apparatus according to claim 33, wherein the given chip is a system on a chip.

35. The apparatus according to claim 33, wherein the rendering memory includes a buffer.

36. The apparatus according to claim 35, wherein the rendering memory is a virtual device buffer.

37. The apparatus according to claim 33, wherein the display device is a liquid crystal display and includes a frame buffer.

38. The apparatus according to claim 33, wherein the means for manipulating includes a fetch, flip, and rotate circuit.

39. A computer-readable storage medium comprising computer-executable instructions for causing a processor to:

manipulate pixels of a given image frame from source positions in a separate pre-manipulation buffer to target positions in a rendering memory provided as part of an embedded display processor on a given chip, the target positions corresponding to the rendered positions in the given image frame;

fetch from the pre-manipulation buffer, a predetermined number of neighboring pixels within a first block, including adjacent cross-row pixels traversing a plurality of rows while in their source positions, the adjacent cross-row pixels being intended for target positions in a common row of the rendering memory in accordance with the manipulation to be performed;

send, from the rendering memory, a set of the neighboring pixels within the first block to the display device in accordance with a given dynamic refresh rate and scheme, the set of the neighboring pixels including adjacent common row pixels in the common row after having been manipulated;

reconfigure addresses for data stored in the rendering memory; and while sending the set of the neighboring pixels within the first block from the rendering memory to the display device, fetch a second predetermined number of neighboring cross-row pixels within a second, different block from the pre-manipulation buffer, which are intended for target positions assigned during address reconfiguration in another, different row of the rendering memory in accordance with a second, different manipulation, such that the rendering memory is simultaneously filled and dumped, wherein the first block is part of a first group of blocks that, when displayed, span an entire width of a display of the display device, each block in the first group comprising multiple pixel slices that each contain a plurality of pixels, wherein the second, different block is part of a second, different group of blocks that, when displayed, span the entire width of the display of the display device, each block in the second group comprising multiple pixel slices that each contain a plurality of pixels, and wherein after one pixel slice from each block in the first group has been sent from one row of physical space in the rendering memory to the display device, the computer-executable instructions to reconfigure the addresses comprise computer-executable instructions to reserve at least part of the one row of physical space for the pixel slices of the second block, such that each pixel slice of the second block becomes newly associated with a unique slice address that was previously associated with one of the pixel slices from one of the blocks in the first group that was sent to the display device.

40. The computer-readable storage medium according to claim 39, wherein the rendering memory includes a buffer.

41. The computer-readable storage medium according to claim 39, wherein the rendering memory is a virtual device buffer.

42. The computer-readable storage medium according to claim 39, wherein the display device is a liquid crystal display and includes a frame buffer.

43. The computer-readable storage medium according to claim 39, further comprising computer-executable instructions for causing the processor to store pixel data in an interim buffer before manipulating the pixel data.

44. The computer-readable storage medium according to claim 39, wherein the manipulation includes a fetch, flip, and rotate operation.

* * * * *